(12) United States Patent
Down et al.

(10) Patent No.: US 8,257,017 B2
(45) Date of Patent: Sep. 4, 2012

(54) METHOD AND DEVICE FOR COOLING A COMPONENT OF A TURBINE

(75) Inventors: Andrew Down, Fiskerton (GB); Ulf Nilsson, Whetstone (GB)

(73) Assignee: Siemens Aktiengesellschaft, München (DE)

( * ) Notice: Subject to any disclaimer, the term of this patent is extended or adjusted under 35 U.S.C. 154(b) by 545 days.

(21) Appl. No.: 12/489,670

(22) Filed: Jun. 23, 2009

(65) Prior Publication Data

US 2009/0317242 A1 Dec. 24, 2009

(30) Foreign Application Priority Data

Jun. 24, 2008 (EP) .................................... 08011428

(51) Int. Cl.
*F04D 29/58* (2006.01)
(52) U.S. Cl. .......... 415/1; 415/58.4; 415/58.7; 415/144; 415/201; 415/176; 415/116
(58) Field of Classification Search .................. 415/115, 415/116, 58.4, 58.5, 58.7, 144, 145, 201, 415/96 R, 97 R, 90 R, 108, 175, 176, 1, 52.1; 60/782, 785, 806
See application file for complete search history.

(56) References Cited

U.S. PATENT DOCUMENTS

| | | | | |
|---|---|---|---|---|
| 2,599,470 A | * | 6/1952 | Meyer | 60/39.093 |
| 2,711,453 A | * | 6/1955 | Leigh, Jr. | 200/81.9 R |
| 2,712,727 A | * | 7/1955 | Morley et al. | 60/39.093 |
| 2,746,671 A | * | 5/1956 | Newcomb | 415/115 |
| 2,915,262 A | * | 12/1959 | Klein | 244/74 |
| 3,088,281 A | * | 5/1963 | Soltau et al. | 60/752 |
| 3,287,906 A | | 11/1966 | McCormick | |
| 3,645,096 A | | 2/1972 | Mittelstaedt | |
| 3,728,039 A | * | 4/1973 | Plemmons et al. | 415/115 |
| 3,871,844 A | * | 3/1975 | Calvin, Sr. | 55/306 |
| 4,329,114 A | | 5/1982 | Coulson | |
| 4,645,415 A | | 2/1987 | Hovan et al. | |
| 4,711,084 A | | 12/1987 | Brockett | |
| 5,414,992 A | * | 5/1995 | Glickstein | 60/782 |
| 5,611,197 A | * | 3/1997 | Bunker | 60/806 |
| 6,231,303 B1 | * | 5/2001 | Tiemann et al. | 415/115 |
| 6,412,270 B1 | | 7/2002 | Marks | |
| 6,422,807 B1 | | 7/2002 | Chow | |
| 2003/0046938 A1 | * | 3/2003 | Mortzheim et al. | 60/782 |

FOREIGN PATENT DOCUMENTS

EP 1013937 B1 5/2007

* cited by examiner

*Primary Examiner* — Edward Look
*Assistant Examiner* — Christopher R Legendre

(57) ABSTRACT

A method for cooling a component of a turbine is provided, wherein a fluid with a pressure below 1 bar is guided away from the component. Moreover, a turbine is described comprising a component, a conduit which is connected to the component so that a fluid can be guided away from the component, and a fluid discharge which is connected to the conduit. The fluid discharge is constructed so that it removes a fluid with a pressure below 1 bar.

10 Claims, 3 Drawing Sheets

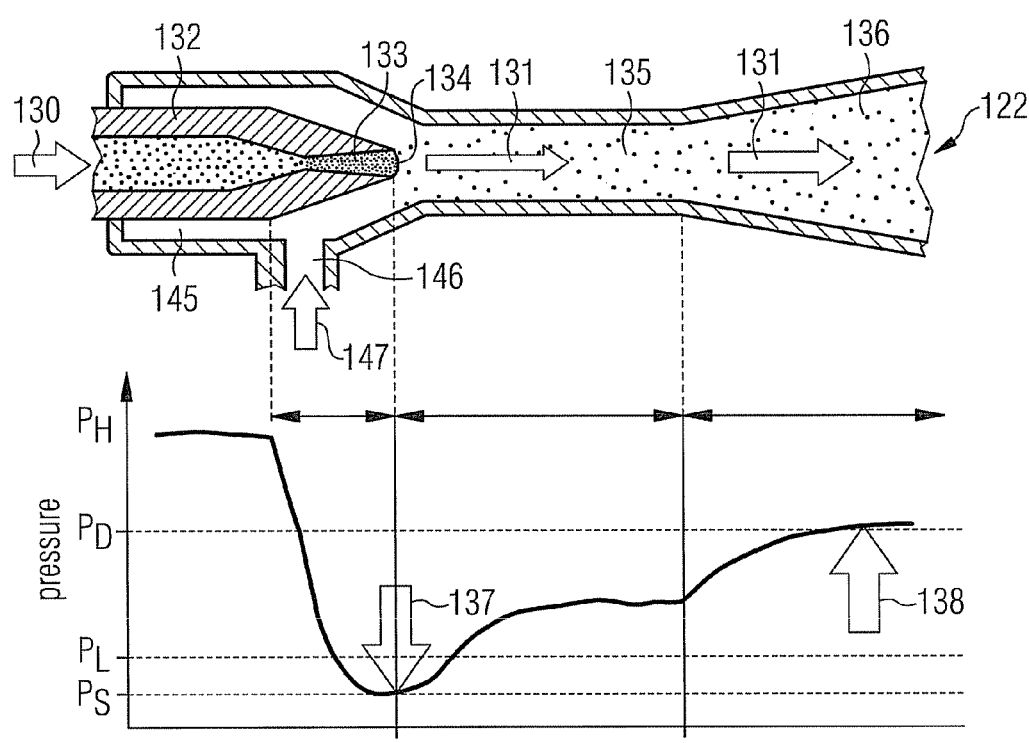

METHOD AND DEVICE FOR COOLING A COMPONENT OF A TURBINE

CROSS REFERENCE TO RELATED APPLICATIONS

This application claims priority of European Patent Office application No. 08011428.3 EP filed Jun. 24, 2008, which is incorporated by reference herein in its entirety.

FIELD OF INVENTION

The present invention relates to a method for cooling a component of a turbine.

BACKGROUND OF INVENTION

In order to achieve high component efficiencies for a turbine and ultimately a gas turbine cycle itself small tip clearances are required. This is even more important for small gas turbines where the relative clearance is increased due to manufacturing limitations and tolerances. One way of controlling the tip clearance in the turbine is to actively cool the casing. For example, the thermal expansion of the casing is matched with the rotor to minimize the clearance without taking the risk of interference during transient and hot restarts.

This type of cooling requires cooling air being bled from the compressor. In small gas turbines having a lower overall pressure ratio and fewer bleed points in the compressor the available air supply is often of a much higher pressure and temperature than needed to perform the cooling task on the turbine casing. This may have at least two effects, one being that due to the higher temperature of the cooling air a minimum clearance can not be achieved at all or only by using excessive mass flows, the other being that after the cooling task the air is released in the flue gases still having a surplus pressure without producing any work which generates additional performance losses.

The first category of solutions is the use of a higher pressure and temperature of the cooling air than required. Another alternative and improvement of the first category is to pre-cool the air before it is applied to the turbine casing. This can be done in a heat exchanger, for example an air-air heat exchanger, an air-water heat exchanger or an air-fuel heat exchanger, or by injecting evaporating water into the air stream. The pre-cooling requires more components and/or more systems, adds costs and potentially decreases the reliability and availability.

A different approach is to use a low expansion material in the turbine casing which allows the turbine rotor to perform the vast portion of the relative movement between the blade tip and the casing minimizing the clearance during operation. This solution does not require any extra cooling air, is able to deal with transient movements but is slow and requires expensive materials in large components, which means that it adds costs.

In U.S. Pat. No. 5,611,197 a closed circuit air cooled turbine where air is bled from the compressor and is used to cool the turbine casing is described. After cooling the turbine casing the air is passed through a heat exchanger and is then injected in the compressor.

In EP 1 013 937 B1 a compressor bleed point at the tip region of the compressor blade row is disclosed.

In U.S. Pat. No. 6,422,807 B1 a closed circuit cooling of a turbine casing where the cooling medium is circulated through internal cavities and where the accumulated heat is removed in heat exchangers is described.

In U.S. Pat. No. 4,329,114 an active clearance control system for a compressor based on convective flow is disclosed.

In U.S. Pat. No. 6,412,270 B1 a method of mixing two bleed streams for a compressor using an ejector before using air for cooling or sealing purposes in a turbine is described.

In U.S. Pat. No. 4,711,084 the use of an ejector in a compressor low pressure air bleed conduit to increase the pressure is shown.

In U.S. Pat. No. 4,645,415 a cooling system where the cooling air is cooled by the flow through a secondary air path of a turbofan gas turbine is described.

SUMMARY OF INVENTION

It is a first objective of the present invention to provide an advantageous method for cooling a component of a turbine. It is a second objective of the present invention to provide an advantageous turbine.

The first objective is solved by a method for cooling a component of a turbine as claimed in the claims. The second objective is solved by a turbine as claimed in the claims. The depending claims define further developments of the invention.

In the inventive method for cooling a component of a turbine a fluid with a pressure below 1 bar is guided away from the component. The invention is based on the use of sub atmospheric pressure to create a sufficient pressure drop to achieve the heat transfer coefficients required for cooling the component. This increases the effectiveness which is due to the low temperature of the fluid used and the optimized pressure ratio for the task. The method is characterized in a low complexity which is due to the absence of a fluid cooler to reach a low supply temperature. It is also a system which is mainly self controlling.

The low pressure in the cooling circuit, i.e. below 1 bar, of the fluid corresponds to a low temperature of the fluid. In order to reduce the temperature of the component of the turbine it is necessary to remove a certain amount of heat, e.g. to maintain a certain heat flux through the component. The same heat flux can be achieved in different ways depending on how the cooling air temperature, the feed pressure, the pressure drop (velocity) and the mass flow are combined. The present invention is based on the use of a fluid with a low pressure and a corresponding low temperature in order not to penalize the overall turbine cycle. The mass flow is matched to the available, in this case generated, pressure drop and temperature to achieve the required heat flux.

Advantageously, the downstream pressure of the fluid in the cooling circuit may be between 0.5 bar and 0.9 bar, preferably between 0.7 bar and 0.8 bar.

The component of the turbine may be a turbine casing or a component of the stator of the turbine. In this case the reduced temperature of the casing or the stator will also reduce the tip clearance. The tip clearance is a function of the temperature difference between the rotor and the stator/casing.

Preferably, air is used as fluid. Moreover, the fluid can be taken from a compressor inlet duct or from an enclosure surrounding the turbine or from a space which comprises at least one part of a fuel system for a gas turbine. Preferably the fluid can be taken from a compressor inlet duct downstream of a filter. The filter avoids unnecessary deterioration of the flow path due to build up of deposits of particles present in the fluid, for example in the air. For example, air may be taken from the compressor inlet duct, downstream of the air filter, which may then be guided to the turbine casing using conduits.

Generally, the turbine can be a gas turbine. Furthermore, the component may be a turbine casing. The turbine casing may especially be in contact with at least one turbine guide vane. Moreover, the turbine casing can comprise a heat shield or a static shroud or it can be in contact with a heat shield or a static shroud.

Alternatively to a use of air from the compressor inlet duct, air may be taken directly from the enclosure surrounding the gas turbine. If this principle is used, a separate air filter placed at the inlet of the conduit may be needed to avoid unnecessary deterioration of the flow path due to build up of deposits of particles present in the air. In this case the air can be taken from the space which comprises parts of a fuel system for the gas turbine. Gas detectors can be used in the enclosures to prevent explosion from happening should there be a fuel leak.

Furthermore, the fluid can be ventilated, especially while it is guided to the component or to the inlet of the cooling system. This can be achieved by means of a ventilation flow inside the enclosure and/or by means of fans which can be arranged such that the entire volume is ventilated. Advantageously the fluid is ventilated with a frequency high enough to avoid rich pockets of fuel from being built up. Nevertheless particular attention should be paid when positioning the air inlet to the cooling system inside the enclosure. The inlet can be placed such that it is facing away from the fuel system and is facing the fresh air from the ventilation intake.

A further alternative is to feed the turbine stator cooling system from a separate, preferably filtered, feed through the enclosure wall.

Generally, after cooling the component the fluid may be guided to a cavity in a compressor casing which is in flow communication with a circumferential groove placed in the area of a first stage of the compressor. Advantageously, the pressure in the groove may be between 0.5 bar and 0.9 bar, preferably between 0.7 bar and 0.8 bar. The circumferential groove can be placed adjacent to a leading edge of a rotor blade or upstream of a leading edge of a rotor blade or at a front portion of a tip of a rotor blade.

Advantageously the fluid, for example the cooling air, can be guided through a sealed path in the turbine casing to perform the cooling. The principle used for the cooling may, for example, be convection or impingement. Should there be a need to enhance the cooling effect, e.g. increasing the pressure ratio over the cooling circuit, than an air ejector can be used where the driving fluid may be taken from the existing compressor bleed. Due to the anticipated high pressure level at the compressor bleed the use of a supersonic air ejector may be advantageous with regards to the compressor bleed air flow required.

The inventive turbine comprises a component, a conduit which is connected to the component such that a fluid can be guided away from the component, and a fluid discharge which is connected to the conduit. In the inventive turbine the fluid discharge is constructed such that it removes a fluid with a pressure below 1 bar. This means that a fluid with a sub atmospheric pressure is used to create a sufficient pressure drop to achieve the heat transfer coefficient required for cooling the component. The inventive method for cooling a component of a turbine can be performed by means of the inventive turbine. Generally, the inventive turbine has the same advantages as the inventive method.

Advantageously, the fluid discharge is constructed such that it removes a fluid with a pressure between 0.5 bar and 0.9 bar, preferably between 0.7 bar and 0.8 bar.

The fluid may be air. The turbine can be a gas turbine. Moreover, the component can be part of a stator of the turbine or at least part of a turbine casing.

The inventive turbine may further comprise a fluid supply. Preferably, the fluid supply and/or the conduit can comprise an inlet with a filter. This avoids unnecessary deterioration of the flow path due to build up of deposits of particles present in the fluid, for example in the air.

The fluid supply can be a compressor inlet duct. Furthermore, the fluid supply can be part of an enclosure surrounding the turbine or a space which comprises at least one part of a fuel system for a gas turbine. If the fluid supply is part of an enclosure surrounding the turbine, at least one gas detector can be placed in the enclosure. The gas detector prevents explosion from happening in case of a fuel leak.

Moreover, a fan and/or a ventilation element may be located inside the enclosure. Preferably the fan and/or the ventilation element may be constructed and located such that the entire volume of the fluid is ventilated with a frequency high enough to avoid rich pockets of fuel from being built up.

Furthermore, the enclosure may comprise a fluid supply with a filter. The filter avoids unnecessary deterioration of the flow path due to build up of deposits of particles present in the fluid, for example in the air.

Preferably the turbine can comprise a fuel system and a fluid supply with an inlet which is placed such that the inlet is facing away from the fuel system. The inlet can, for example, be placed such that it is facing the fresh air from a ventilation intake.

The turbine can comprise a compressor with a casing and a conduit may connect a cavity in the compressor casing with a circumferential groove for guiding the fluid away from the component. The circumferential groove can be placed in the area of a first stage of the compressor. Preferably the circumferential groove can be placed adjacent to a leading edge of a rotor blade or upstream of a leading edge of a rotor blade or at a front portion of a tip of a rotor blade.

Furthermore, the turbine may comprise an ejector. The ejector can be located between the compressor and the component. For example, the ejector can be a supersonic air ejector. By means of the ejector the cooling effect, e.g. the increase of the pressure ratio over the cooling circuit, can be enhanced.

Generally, the present invention offers several advantages, for example high effectiveness of the cooling, low complexity of the circuit and an improved overall turbine performance. The high effectiveness is due to the low temperature of the fluid, for example air, used and the optimized pressure ratio for the task.

The low complexity is due to the absence of a fluid cooler, for example an air cooler, to reach a low supply temperature. It is also a system which is mainly self controlling. The lowest pressure in the circuit, e.g. where the cooling air is discharged, is depending on the load of the turbine, for example of the gas turbine, or more specifically the compressor. The change in pressure with load will depend in part on whether the invention is applied to a constant speed single shaft gas turbine or a variable speed gas turbine.

One further advantage of the invention is that there is no risk of back flow at off design conditions, e.g. low loads, which requires conventional clearance control systems to change the air supply to a further downstream location in the compressor still having a positive drive pressure. A change of flow direction can otherwise, if the same air supply is connected to the bearings of the gas turbine, suck lubricant oil out of the bearings generating risks for fire and build up of carbon deposits in seals. If needed for circumventing pinch points (contact clearance) during hot restarts a valve may be used to shut off the air flow through the cooling circuit. When using an ejector as a pressure booster for the cooling air no extra moving parts including valves are required. If the cooling circuit is shut off the small flow of bleed air from the compressor will simply be discharged through the air intake for the mainstream flow in the ejector.

The overall performance for the gas turbine is improved due to the minimized tip clearance and no additional loss of mass flow and compressor work when not utilising the bled off air fully. The cooling air injected/sucked into the compressor has a higher temperature after cooling the component, for example the turbine casing, compared to the main flow in the compressor at the location where the air is discharged. Since the cooling air flow is anticipated to be only a small fraction of a percent of the total flow this negative impact on performance is more than compensated by advantages elsewhere.

BRIEF DESCRIPTION OF THE DRAWINGS

Further features, properties and advantages of the present invention will be come clear from the following description of an embodiment in conjunction with the accompanying drawings. The described features are advantages alone and in combination with each other.

FIG. 5 schematically shows an ejector in a sectional view.

DETAILED DESCRIPTION OF INVENTION

Figure 1:
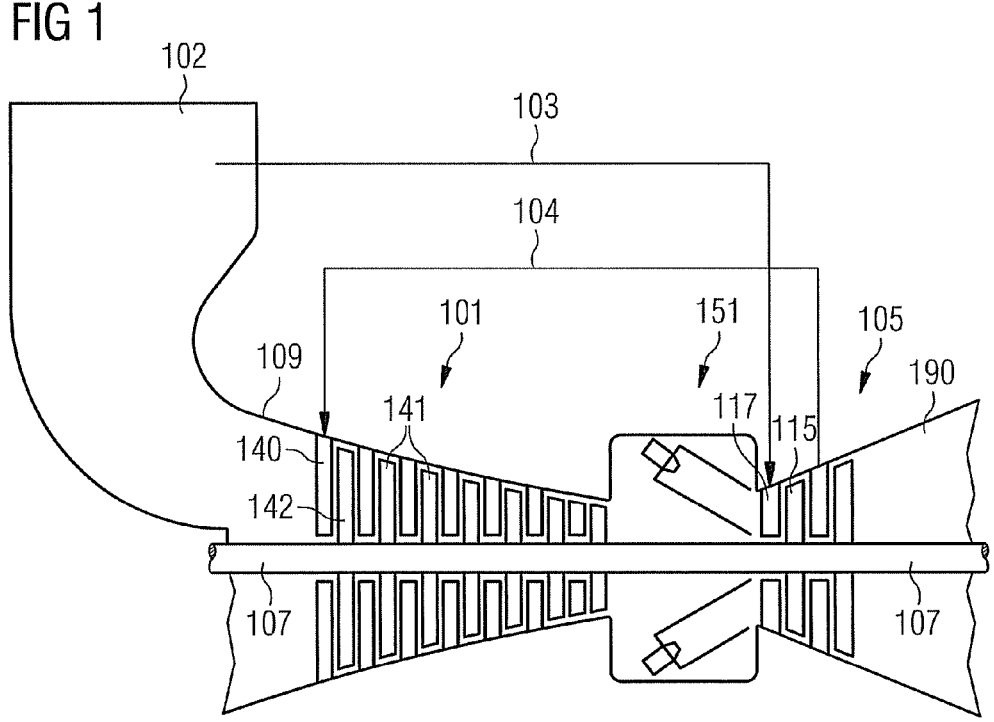
FIG. 1 schematically shows an inventive gas turbine where the cooling air is taken from the compressor inlet duct.

An embodiment of the present invention will now be described with reference to FIGS. 1 to 5. FIG. 1 schematically shows an inventive gas turbine. The gas turbine comprises a rotation axis with a rotor. The rotor comprises a shaft 107. Along the rotor a suction portion with a casing 109, a compressor 101, a combustion portion 151, a turbine 105 and an exhaust portion with a casing 190 are located.

The combustion portion 151 communicates with a hot gas flow channel which may have a circular cross section, for example. The turbine 105 comprises a number of turbine stages. Each turbine stage comprises rings of turbine blades. In flow direction of the hot gas in the hot gas flow channel a ring of turbine guide vanes 117 is followed by a ring of turbine rotor blades 115. The turbine guide vanes 117 are connected to an inner casing of a stator. The turbine rotor blades 115 are connected to the rotor. The rotor is connected to a generator, for example.

During operation of the gas turbine air is sucked and compressed by means of the compressor 101. The compressed air is led to the combustion portion 151 and is mixed with fuel. The mixture of air and fuel is then combusted. The resulting hot combustion gas flows through a hot gas flow channel to the turbine guide vanes 117 and the turbine rotor blades 115 and actuates the rotor.

The compressor 101 of the gas turbine comprises a compressor inlet duct 102 through which the air is led to the suction portion 109. A conduit connects the compressor inlet duct 102 with the turbine casing. Through this conduit air with a pressure below 1 bar is guided to the turbine casing. The flow direction of this low pressure cooling air through the conduit is indicated in FIG. 1 by an arrow 103.

Another conduit connects the turbine casing with the compressor casing. Through this conduit the cooling air is guided away from the turbine casing towards the compressor 101. The cooling air is injected into the compressor 101 in the area of a first stage 140 of stator blades of the compressor 101 and/or in the area of a first stage 142 of rotor blades of the compressor 101. The flow direction of the cooling air through this conduit back to the compressor is indicated by an arrow 104. Preferably the compressor comprises a cavity with a circumferential groove which is placed in the area of the first stage 140, 142 of the compressor 101 for guiding the cooling air away from the turbine casing back to the compressor 101. The circumferential groove is placed adjacent to a leading edge of a compressor rotor blade 142, 141 or upstream of a leading edge of a compressor rotor blade 142, 141 or a front portion of a tip of a compressor rotor blade 142, 141.

At full load conditions only the first stage of the compressor will experience a pressure below atmospheric pressure. At low part loads more stages, for example also the second and third stage, may show subatmospheric pressure. However, the first stage will always show the lowest pressure in the compressor.

Figure 2:
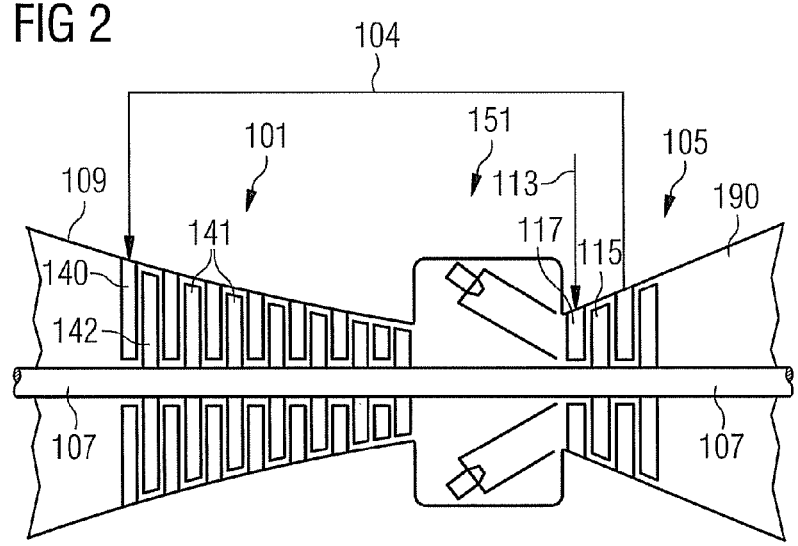
FIG. 2 schematically shows an inventive gas turbine where the cooling air is taken from the enclosure or through the enclosure wall.

FIG. 2 schematically shows another variant of an inventive gas turbine where the cooling air is taken from the enclosure or through the enclosure wall of the turbine 105. In contrast to FIG. 1 the cooling air with a pressure below 1 bar is taken from the enclosure or through the enclosure wall of the gas turbine. The flow direction of the cooling air from the enclosure or through the enclosure wall towards the turbine casing is indicated by an arrow 113.

Figure 3:
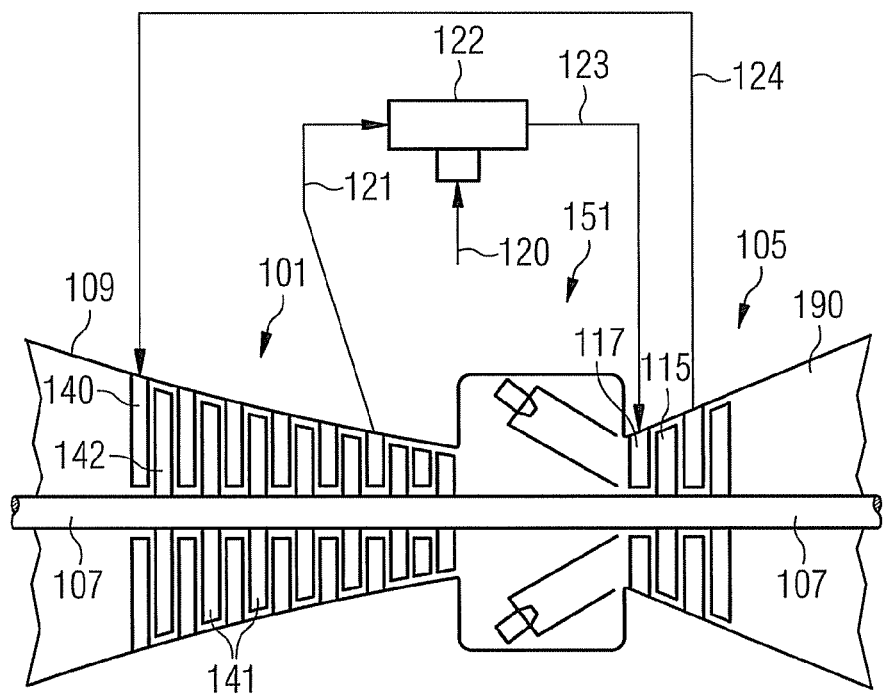
FIG. 3 schematically shows an inventive gas turbine where the cooling air is taken from the enclosure and is pressure boosted by an existing compressor bleed.

A further variant of an inventive gas turbine is schematically shown in FIG. 3 where the cooling air taken from the enclosure is pressure boosted by an existing compressor bleed. In contrast to FIGS. 1 and 2 the cooling air is pressure boosted by means of an ejector 122 before it is guided to the turbine casing. First, the cooling air is taken from the enclosure of the gas turbine and is guided to the ejector 122. The flow direction of the cooling air to the ejector 122 is indicated by an arrow 120. The cooling air is pressure boosted by means of air which is led through the conduit from the compressor 101 to the ejector 122. The flow direction of the air through this conduit from the compressor 101 to the ejector 122 is indicated by an arrow 121. The pressure boosted cooling air is then guided to the turbine casing to cool the turbine casing and is then guided back to the compressor casing as described in conjunction with FIGS. 1 and 2. The flow direction of the pressure boosted cooling air to the turbine casing is indicted by an arrow 123. The flow direction of the cooling air away from the turbine casing back to the compressor is indicated by an arrow 124.

Figure 4:
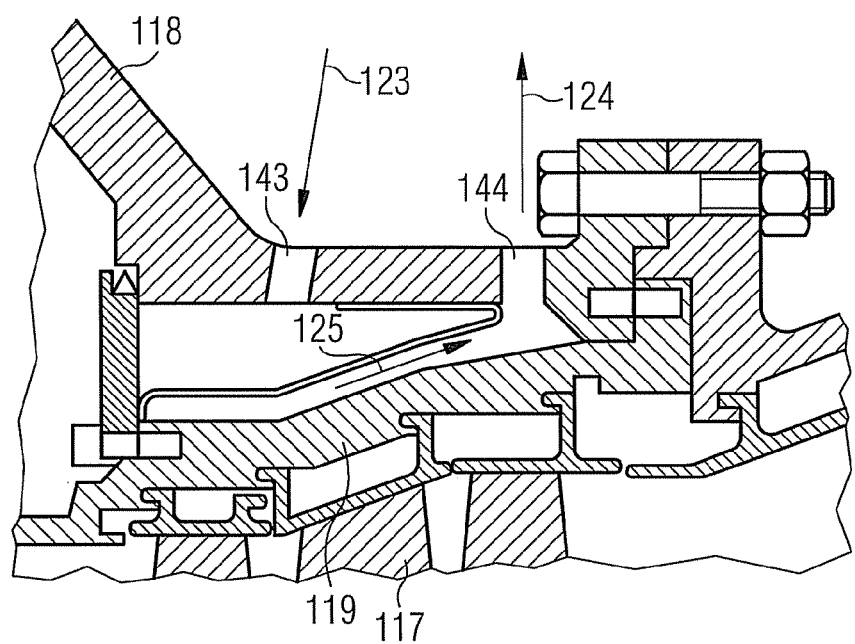
FIG. 4 schematically shows part of an inventive gas turbine in a sectional view.

FIG. 4 schematically shows details of the cooling circuit in the turbine casing. The turbine casing 118 comprises an inlet 143 for cooling air and an outlet 144 for cooling air. The cooling air coming from the compressor inlet duct 102 or coming from the enclosure or through the enclosure wall 113 is guided through the inlet 143 to an inner wall 119 of the turbine 105. A number of turbine guide vanes 117 are connected to the inner wall 119. The flow direction of the cooling air through the inlet 143 is indicated by an arrow 123. After cooling the inner wall 119 and the turbine casing 118 the cooling air is guided through the outlet 144 towards the compressor 101. The flow direction of the cooling inside the turbine casing 118 is indicated by an arrow 125. The flow direction of the cooling air through the outlet 144 is indicated by an arrow 124.

FIG. 5 schematically shows the principle of an ejector 122. The ejector 122 is schematically shown in a sectional view. The ejector 122 comprises in flow direction 130, 131 a nozzle 132 a mixing unit 135 and a diffuser 136. The nozzle 132 comprises a throat 133 and an exit 134. A drive flow is guided through the nozzle 132 to the throat 133 and is then guided through the exit 134 towards the mixing unit 135. The flow direction of the drive flow is indicated by an arrow 130.

The nozzle 132 is surrounded by a circumferential flow channel 145 which comprises an inlet 146 for cooling air. The flow direction of the cooling air through the inlet 146 to the nozzle 132 is indicated by an arrow 147.

In the mixing unit 135 the drive flow is mixed with the cooling air and the mixture is guided to the diffuser 136. The flow direction of the drive flow and the cooling air in the mixing unit 135 and in the diffuser 136 is indicated by arrows 131.

The diagram below the ejector 122 in FIG. 5 schematically shows the pressure in the nozzle 132 in the mixing unit 135 and in the diffuser 136. The X-axis of the diagram shows the different locations, i.e. nozzle 132, mixing unit 135 and diffuser 136. The Y-axis shows the pressures in these regions. In the nozzle 132 the drive flow has a particular pressure $P_H$. This pressure $P_H$ decreases when the drive flow passes the throat 133 and further decreases when the drive flow passes the exit 134 of the nozzle 132. At the position of the exit 134 the pressure has its minimum value due to a pressure differential. This is indicated by an arrow 137. At the Y-axis of the diagram the pressure of the cooling air which is injected through the inlet 146 is indicated by $P_L$ and the minimum of the pressure at the exit 134 is indicated as $P_S$, which corresponds to the minimum pressure value.

In the mixing unit 135 the pressure of the mixture of the driving flow and the cooling air increases. The pressure further increases when the mixture passes the diffuser 136 due to the reduced flow velocity of the mixture in the diffuser 136. The pressure of the mixture when it leaves the diffuser 136 is indicated by $P_D$. The difference between the pressure $P_D$ and the initial pressure of the cooling air $P_L$ is indicated by an arrow 138.

The invention claimed is:

1. A method for cooling a turbine casing, comprising:
 guiding cooling air from an inlet duct of a compressor to the turbine casing via a conduit connecting the compressor inlet duct and the turbine casing,
 cooling the turbine casing with the cooling air,
 guiding the cooling air with a pressure below 1 bar away from the turbine casing, after cooling the turbine casing, and
 injecting the cooling air guided away from the turbine casing into the compressor in the area of a first stage of stator blades of the compressor and/or in the area of a first stage of rotor blades of the compressor.

2. The method as claimed in claim 1, further comprising filtering the cooling air upstream of the compressor inlet duct.

3. The method as claimed in claim 1, wherein the turbine casing is in contact with a turbine guide vane.

4. The method as claimed in claim 1, wherein the air is ventilated.

5. The method as claimed in claim 1, wherein the cooling air is injected into the compressor in the area of the first stage of stator blades of the compressor and/or in the area of the first stage of rotor blades of the compressor at a pressure within a range between 0.5 bar and 0.9 bar.

6. The method as claimed in claim 5, wherein the pressure is in a range between 0.7 and 0.8 bar.

7. The method as claimed in claim 1, wherein an ejector is used to pressure boost the cooling air before guiding the cooling air to the turbine casing.

8. The method as claimed in claim 1, wherein the cooling air is guided through a sealed path in the component in order to cool the turbine casing.

9. A gas turbine engine, comprising:
 a compressor having an inlet duct;
 a turbine casing;
 a first conduit connecting the inlet duct of the compressor to the turbine casing to guide a cooling air from the compressor inlet duct to the turbine casing;
 a second conduit connected to the turbine casing so that the cooling air can be guided away from the turbine casing at a pressure below 1 bar after cooling the turbine casing and injected into the compressor in the area of a first stage of stator blades of the compressor and/or in the area of a first stage of rotor blades of the compressor;
 a fluid discharge connected to the second conduit,
 wherein the fluid discharge removes the cooling air with a pressure below 1 bar after cooling the turbine casing into the second conduit.

10. The turbine as claimed in claim 9, further comprising an ejector which is located between the compressor and the turbine casing.

* * * * *